US010247975B2

(12) United States Patent
Yun et al.

(10) Patent No.: US 10,247,975 B2
(45) Date of Patent: Apr. 2, 2019

(54) DISPLAY DEVICE

(71) Applicant: Samsung Display Co., Ltd., Yongin-si, Gyeonggi-do (KR)

(72) Inventors: Hae Ju Yun, Hwaseong-si (KR); Yukinori Asakawa, Seongnam-si (KR); Kwang Soo Bae, Suwon-si (KR); Min Jeong Oh, Incheon (KR)

(73) Assignee: Samsung Display Co., Ltd. (KR)

( * ) Notice: Subject to any disclaimer, the term of this patent is extended or adjusted under 35 U.S.C. 154(b) by 3 days.

(21) Appl. No.: 14/941,393

(22) Filed: Nov. 13, 2015

(65) Prior Publication Data

US 2016/0209699 A1    Jul. 21, 2016

(30) Foreign Application Priority Data

Jan. 21, 2015 (KR) ........................ 10-2015-0010087

(51) Int. Cl.
*G02F 1/1333* (2006.01)
*G02F 1/1335* (2006.01)
(Continued)

(52) U.S. Cl.
CPC ...... *G02F 1/133377* (2013.01); *G02F 1/1335* (2013.01); *G02F 1/1337* (2013.01);
(Continued)

(58) Field of Classification Search
CPC . G02F 1/1335; G02F 1/133526; G02F 1/1341
See application file for complete search history.

(56) References Cited

U.S. PATENT DOCUMENTS

| 7,982,821 B2* | 7/2011 | Watanabe ............ G02B 3/0056 349/62 |
| 8,351,017 B2* | 1/2013 | Mishra .............. G02F 1/133514 349/116 |

(Continued)

FOREIGN PATENT DOCUMENTS

| CN | 102831822 A | 12/2012 |
| EP | 2 808 729 A1 | 12/2014 |

(Continued)

OTHER PUBLICATIONS

European Search Report corresponding to EP Application No. 15195594.5, dated May 13, 2016, 7 pages.

*Primary Examiner* — Michael H Caley
*Assistant Examiner* — Jonathan Y Jung
(74) *Attorney, Agent, or Firm* — Innovation Counsel LLP

(57) ABSTRACT

Embodiments provide a display device including: a thin film transistor disposed on an insulation substrate including a plurality of pixels; a common electrode and a pixel electrode disposed on the thin film transistor to overlap each other while interposing an insulating layer therebetween; a liquid crystal layer filling microcavities differentiated by pixel electrodes, the pixel electrodes comprising the pixel electrode; and a roof layer that is disposed on a microcavity of the microcavities and includes an injection hole extending to the microcavity and a supporting member to support the microcavity; and an optical member disposed on the supporting member, wherein the injection hole is disposed between adjacent microcavities in a column direction, and the supporting member is disposed between adjacent microcavities in a row direction. Total reflection of light, bad alignment, and light leakage which may occur in the display device may be prevented by the optical member.

14 Claims, 9 Drawing Sheets

(51) Int. Cl.
   *G02F 1/1368* (2006.01)
   *G02F 1/1337* (2006.01)
   *G02F 1/1341* (2006.01)
(52) U.S. Cl.
   CPC .......... *G02F 1/1341* (2013.01); *G02F 1/1368* (2013.01); *G02F 1/133345* (2013.01); *G02F 1/133526* (2013.01); *G02F 1/133788* (2013.01); *G02F 2001/133738* (2013.01)

(56) References Cited

U.S. PATENT DOCUMENTS

| | | | |
|---|---|---|---|
| 8,614,776 B2 | 12/2013 | Lee et al. | |
| 2007/0188683 A1* | 8/2007 | Naka | G02F 1/133555 349/114 |
| 2010/0321619 A1* | 12/2010 | Tsai | G02F 1/133526 349/114 |
| 2011/0096255 A1* | 4/2011 | Rho | C09K 19/0275 349/33 |
| 2012/0218501 A1* | 8/2012 | Lee | G02F 1/134309 349/139 |
| 2013/0177732 A1 | 7/2013 | Lee et al. | |
| 2013/0182203 A1 | 7/2013 | Lee et al. | |
| 2013/0286312 A1* | 10/2013 | Choi | G02F 1/136 349/42 |
| 2013/0293799 A1* | 11/2013 | Lee | G02F 1/13394 349/42 |
| 2014/0146278 A1 | 5/2014 | Lee et al. | |
| 2014/0160395 A1* | 6/2014 | Park | G02B 27/2214 349/61 |
| 2015/0015824 A1 | 1/2015 | Lee et al. | |
| 2015/0036079 A1 | 2/2015 | Yun et al. | |
| 2015/0109566 A1 | 4/2015 | Yun et al. | |
| 2015/0131042 A1 | 5/2015 | Yun et al. | |

FOREIGN PATENT DOCUMENTS

| | | |
|---|---|---|
| KR | 1020050060568 | 6/2005 |
| KR | 1020110019229 | 2/2011 |
| KR | 1020110073210 | 6/2011 |
| KR | 1020120026880 | 3/2012 |
| KR | 1020130081086 | 7/2013 |
| KR | 1020140071550 | 6/2014 |

* cited by examiner

DISPLAY DEVICE

CROSS-REFERENCE TO RELATED APPLICATION

This application claims priority to and the benefit of Korean Patent Application No. 10-2015-0010087 filed in the Korean Intellectual Property Office on Jan. 21, 2015, the entire contents of which are incorporated herein by reference.

BACKGROUND (a) Field

The present application relates to a display device to be formed with one substrate and to include an optical member, and a manufacturing method thereof.

(b) Description of the Related Art

As one of the most widely used flat panel displays at present, a liquid crystal display (LCD) includes two display panels on which electric field generating electrodes such as a pixel electrode and a common electrode are formed, and a liquid crystal layer interposed between the two display panels. The LCD generates an electric field on the liquid crystal layer by applying a voltage to the electric field generating electrodes, determines alignment directions of liquid crystal molecules of the liquid crystal layer through the generated electric field, and controls polarization of incident light, thereby displaying an image.

Two sheets of display panels of which the LCD consists may include a thin film transistor array panel and an opposing display panel. In the thin film transistor array panel, a gate line for transmitting a gate signal and a data line for transmitting a data signal are formed to cross each other, and a thin film transistor coupled to the gate line and the data line, a pixel electrode coupled to the thin film transistor, and the like may be formed. In the opposing display panel, a light blocking member, a color filter, a common electrode, and the like may be formed. If necessary, the light blocking member, the color filter, and the common electrode may be formed on the thin film transistor array panel.

However, in a conventional liquid crystal display, two substrates are indispensably used and constituent elements are separately formed on the two substrates, thereby requiring a long processing time as well as making the display device heavy, thick, and costly.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a display device and a manufacturing method thereof that may reduce weight, thickness, cost, and processing time by manufacturing the display device using one substrate.

Further, embodiments have made in an effort to provide a display device and a manufacturing method thereof that may prevent total reflection of light, bad alignment, and light leakage by including an optical member.

An exemplary embodiment provides a display device including: a thin film transistor disposed on an insulation substrate including a plurality of pixels; a common electrode and a pixel electrode disposed on the thin film transistor to overlap each other while interposing an insulating layer therebetween; a liquid crystal layer filling microcavities differentiated by pixel electrodes, the pixel electrodes comprising the pixel electrode; a roof layer that is disposed on a microcavity of the microcavities and includes an injection hole extending to the microcavity and a supporting member to support the microcavity; and an optical member disposed on the supporting member, wherein the injection hole is disposed between adjacent microcavities in a column direction, and the supporting member is disposed between adjacent microcavities in a row direction.

The optical member may have a semicircular-pillar shape.

The optical member may be disposed to have a convex shape on the insulation substrate.

An edge of the optical member may be disposed overlapping at least a portion of adjacent microcavities.

A diameter of the optical member may be disposed to be wider than a width of a predetermined second valley, and to be narrower than a sum of widths of the second valley and the microcavity.

The optical member may be disposed at the same layer as the roof layer.

Liquid crystal molecules contained in the liquid crystal layer may be disposed in a horizontal alignment mode.

An alignment layer disposed on a surface of the microcavity may be further included, wherein the alignment layer may be a horizontal alignment layer.

An overcoat disposed on the roof layer to cover the injection hole may be further included.

A first insulating layer disposed under the roof layer and a second insulating layer disposed over the roof layer may be further included.

The optical member may be disposed to have a concave shape on the insulation substrate.

The optical member may have a many-sided surface disposed with a polygon shape, and may be disposed to have a convex shape on the insulation substrate.

According to the exemplary embodiment, one substrate may be used to manufacture the display device, thereby reducing weight, thickness, cost, and processing time of the display device.

In addition, according to the exemplary embodiment, the optical member may be included in the display device, thereby preventing total reflection of light, bad alignment, and light leakage which may occur in the display device.

DETAILED DESCRIPTION OF THE EMBODIMENTS

Figure 1:
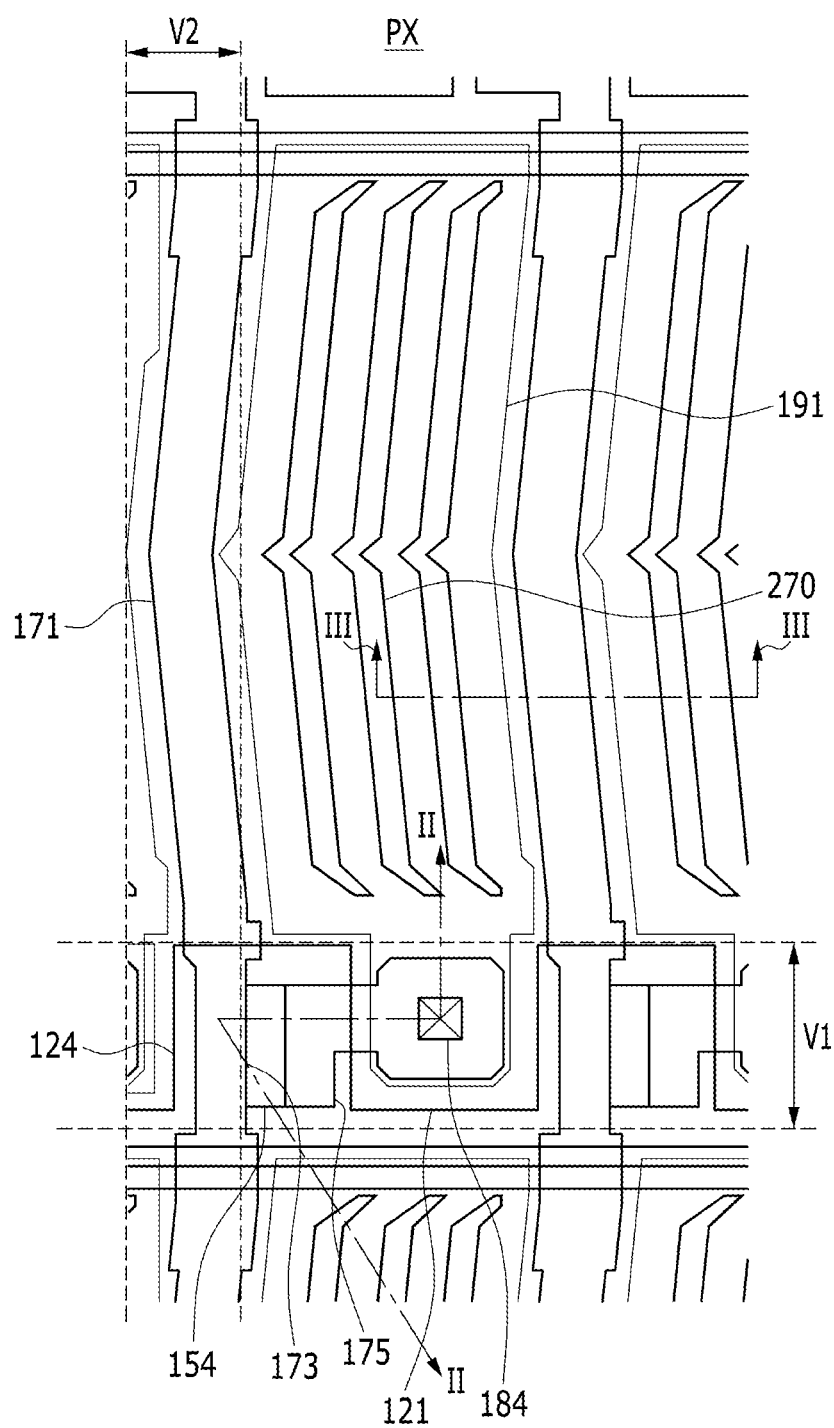
FIG. 1 is a top plan view illustrating a pixel of a display device according to a first exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device according to a first exemplary embodiment will be described with reference to FIGS. 1 to 3.

Figure 2:
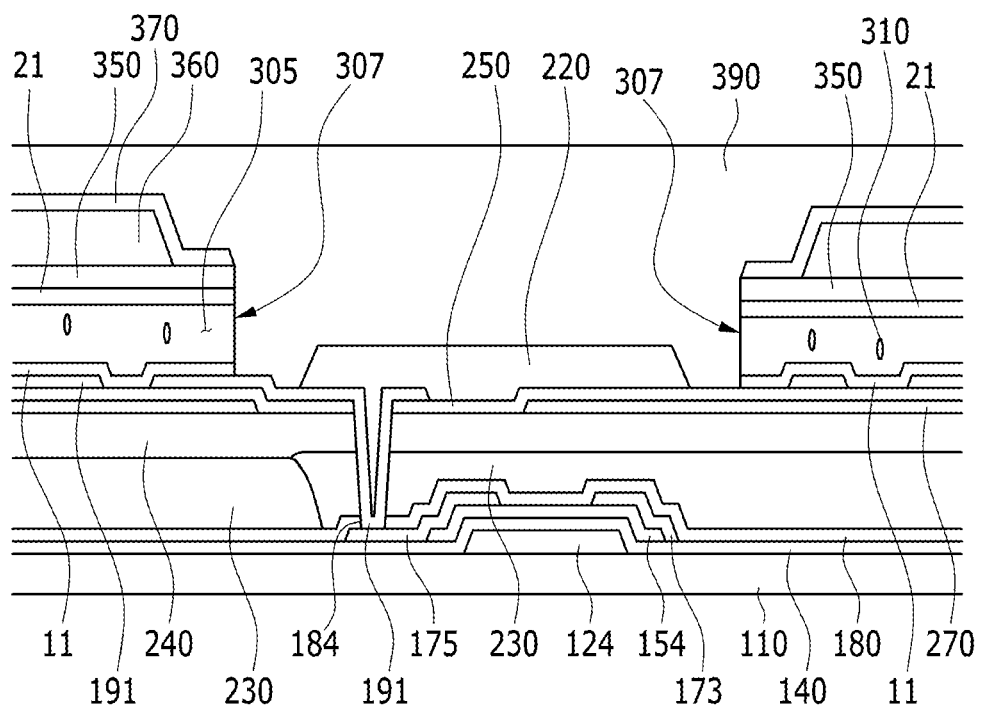
FIG. 2 is a cross-sectional view of FIG. 1 taken along the line II-II.
Figure 3:
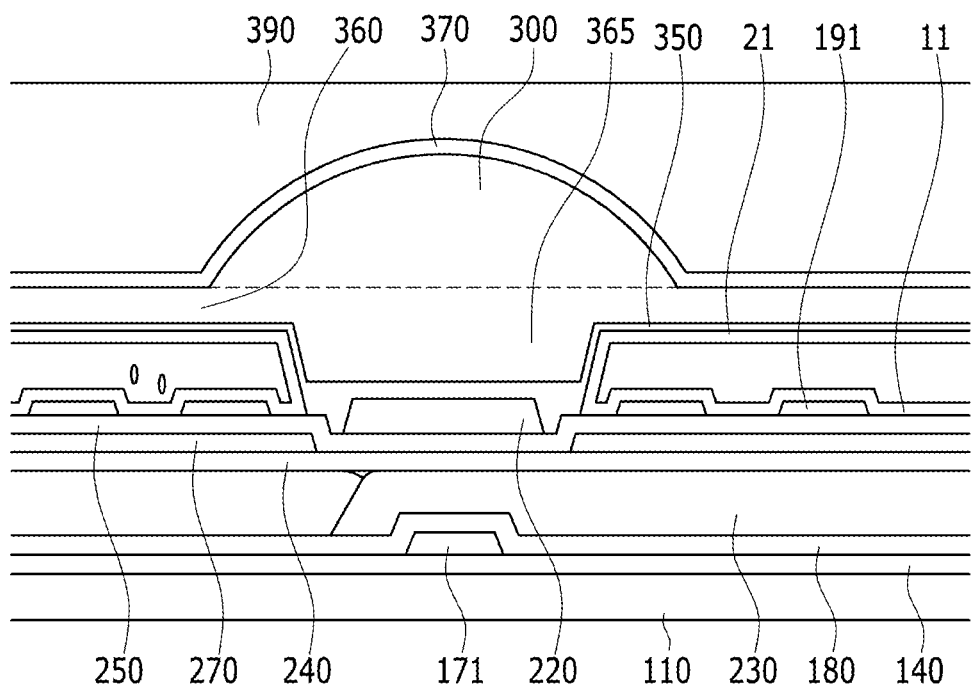
FIG. 3 is a cross-sectional view of FIG. 1 taken along III-III.

FIG. 1 is a top plan view illustrating a pixel of the display device according to the first exemplary embodiment, FIG. 2 is a cross-sectional view of FIG. 1 taken along the line II-II, and FIG. 3 is a cross-sectional view of FIG. 1 taken along the line III-III.

First, the display device according to the first exemplary embodiment will be schematically described.

The display device according to the first exemplary embodiment includes an insulation substrate 110 that is formed of a material such as glass or plastic, and a roof layer 360 formed on the insulation substrate 110.

Microcavities 305 covered by the roof layer 360 are formed on the insulation substrate 110. The roof layer 360 extends in a row direction, and a plurality of microcavities 305 are formed under the single roof layer 360.

A plurality of pixels PX are positioned on the insulation substrate 110. The pixels PX are arranged in a matrix form that includes a plurality of pixel columns and rows. One pixel PX is a region that overlaps one pixel electrode 191.

A first valley V1 is positioned along an extending direction of a gate line 121 between the adjacent pixels PX, and a second valley V2 is positioned between rows of the adjacent pixels PX.

In other words, the microcavities 305 may be arranged in a matrix form, the first valley V1 may be positioned between the microcavities 305 adjacent in a column direction, and the second valley V2 may be positioned between the microcavities 305 adjacent in a row direction.

The roof layer 360 is formed in the extending direction of a data line 171. In this case, an injection hole 307 is formed in the first valley V1 such that the roof layer 360 is removed and then constituent elements positioned under the roof layer 360 are exposed.

Each roof layer 360 is formed between the adjacent second valleys V2 to be separated from the insulation substrate 110, thereby forming the microcavity 305. In addition, each roof layer 360 is formed in the second valley V2 to be attached to the insulation substrate 110, thereby covering the opposite sides of the microcavity 305.

In other words, a supporting member 365 forming opposite lateral walls of the microcavity 305 may be formed in each roof layer 360 of the second valley V2 such that it may support the microcavity 305.

The aforementioned structure of the display device according to the first exemplary embodiment may be seen as an example, and thus it may be modified in various ways.

For example, arrangement of the pixel PX, the first valley V1, and the second valley V2 may be modified, the roof layers 360 may be coupled to each other in the first valley V1, and each roof layer 360 may be formed to be partially separated from the substrate 110 in the second valley V2 such that the adjacent microcavities 305 are coupled to each other.

The display device according to the first exemplary embodiment will now be described with reference to FIGS. 1 to 3.

First, a gate conductor including the gate line 121 is formed on an insulation substrate 110 that is formed of transparent glass or plastic.

The gate line 121 includes a wide end portion for connection with a gate electrode 124 and other layers or an external driving circuit (not shown). The gate line 121 may be formed of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), etc. However, the gate line 121 may have a multilayer structure including at least two conductive layers having different physical properties.

A gate insulating layer 140 formed of a silicon nitride (SiNx) or a silicon oxide (SiOx) is formed on the gate conductor 121. The gate insulating layer 140 may have a multilayer structure in which at least two insulating layers having different physical properties are included.

A semiconductor 154 formed of amorphous silicon or polysilicon is formed on the gate insulating layer 140. The semiconductor 154 may include an oxide semiconductor.

Ohmic contacts (not shown) are formed on the semiconductor 154. The ohmic contacts may be formed of a material such as n+hydrogenated amorphous silicon highly doped with an n-type impurity such as phosphorus, or may be formed of a silicide. The ohmic contacts may be coupled in pairs to be disposed on the semiconductor 154. The ohmic contacts may be omitted if the semiconductor 154 is the oxide semiconductor.

The data line 171 including a source electrode 173 and a data conductor including a drain electrode 175 are formed on the semiconductor 154 and the gate insulating layer 140.

The data line 171 includes a wide end portion for connection with another layer or an external driving circuit (not shown). The data line 171 transmits a data signal and mainly extends in a vertical direction to cross the gate line 121.

In this case, in order to obtain maximum transmittance of the liquid crystal display, the data line 171 may include a first curved portion having a curved shape, and parts of the curved portion may meet each other in a middle region of the pixel area to form a V shape. A second curved portion may be further included in the middle region of the pixel area such that it is curved to form a predetermined angle with the first curved portion.

The first curved portion of the data line 171 may be curved to form an angle of about 7° with a vertical reference line that forms an angle of 90° with a direction in which the gate line 121 extends. The second curved portion disposed in the intermediate region of the pixel area may be curved to form an angle of about 7° to about 15° with the first curved portion.

The source electrode 173 is a part of the data line 171 and is disposed on the same line as the data line 171. The drain electrode 175 is formed to extend in parallel with the source electrode 173. Thus, the drain electrode 175 is in parallel with the part of the data line 171.

The gate electrode 124, the source electrode 173, and the drain electrode 175 form one thin film transistor (TFT) along with the semiconductor 154, and a channel of the thin film transistor is formed in the semiconductor 154 between the source electrode 173 and the drain electrode 175.

By including the source electrode 173 that is positioned on the same line as the data line 171 and the drain electrode 175 that extends in parallel with the data line 171, the display device according to the exemplary embodiment can increase a width of the thin film transistor without increasing an area taken up by the data conductor, thereby increasing the aperture ratio of the display device.

However, a display device according to another exemplary embodiment may be formed such that its source and drain electrodes 173 and 175 have different shapes.

The data line 171 and the drain electrode 175 may be preferably formed of a refractory metal such as molybdenum, chromium, tantalum, titanium, etc., or an alloy thereof, and they may have a multilayer structure including a refractory metal layer (not shown) and a low-resistance conductive layer (not shown). An example of the multilayer structure may be a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, in addition to those described above, the data line 171 and the drain electrode 175 may be made of various metals or conductors.

A passivation layer 180 is disposed on the data conductors 171, 173, and 175, the gate insulating layer 140, and an exposed portion of the semiconductor 154. The passivation layer 180 may be made of an organic insulating material, an inorganic insulating material, or the like.

A color filter 230 is formed in each pixel area PX on the passivation layer 180. Each color filter 230 may display one of the primary colors such as three primary colors of red, green, and blue. The color filter 230 is not limited to display the three primary colors of red, green, and blue, but may display cyan, magenta, yellow, and white-based colors. Unlike those illustrated above, the color filter 230 may be elongated in the column direction along between the adjacent data lines 171.

An organic layer 240 is disposed on the color filter 230. The organic layer 240 has a larger thickness than that of the passivation layer 180, and may have a smooth surface.

The organic layer 240 may be disposed in a display area where a plurality of pixels are disposed, and may not be disposed in a peripheral area where a gate pad portion or data pad portion is formed. Alternatively, the organic layer 240 may be positioned even in the peripheral area where the gate pad portion or data pad portion is formed.

A contact hole 184 is provided in the organic layer 240, the color filter 230, and the passivation layer 180.

A common electrode 270 is positioned on the organic layer 240. The common electrode 270 may have a planar shape, and may be disposed in the display area where the plurality of pixels are disposed but not in the peripheral area where the gate pad portion or data pad portion is formed.

The common electrode 270 is formed of a transparent conductive layer such as indium tin oxide (ITO) or indium zinc oxide (IZO).

An interlayer insulating layer 250 is disposed on the common electrode 270. The interlayer insulating layer 250 may be formed of an inorganic insulating material such as a silicon nitride (SiNx), a silicon oxide (SiOx), a silicon oxvnitride (SiOxNy), etc. The interlayer insulating layer 250 serves to protect the color filter 230 made of the organic material and to insulate the common electrode 270 from the pixel electrode 191. That is, even if the common electrode 270 is formed to overlap the pixel electrode 191, the common electrode 270 and the pixel electrode 191 may be prevented from being short-circuited because the interlayer insulating layer 250 is formed on the common electrode 270.

The pixel electrode 191 is disposed on the interlayer insulating layer 250. The pixel electrode 191 includes a curved edge that is substantially in parallel with the first and second curved portions of the data line 171.

The pixel electrode 191 may be formed of a transparent conductive layer such as ITO or IZO.

The pixel electrode 191 is physically and electrically coupled to the drain electrode 175 through the contact hole 184 that is formed in the organic layer 240, the color filter 230, and the passivation layer 180, and is applied with a voltage from the drain electrode 175.

The pixel electrode 191 is applied with a data voltage from the drain electrode 175, and the common electrode 270 is applied with a predetermined reference voltage from a reference voltage applying unit that is disposed outside of the display area.

The pixel electrode 191 and the common electrode 270 generate an electric field according to these applied voltages, and liquid crystal molecules 310 of a liquid crystal layer over the two electrodes 191 and 270 rotate in a direction parallel to a direction of the electric field. Polarization of light passing through the liquid crystal layer varies depending on rotation directions of the liquid crystal molecules 310 determined as described above.

A first insulating layer 350 may be further formed on the pixel electrode 191 such that it is separated by a predetermined distance from the pixel electrode 191. The first insulating layer 350 may be made of an inorganic insulating material such as a silicon nitride (SiNx), a silicon oxide (SiOx), etc.

The microcavity 305 is formed between the pixel electrode 191 and the first insulating layer 350. In other words, the microcavity 305 is enclosed by the pixel electrode 191 and the first insulating layer 350. Widths and sizes of the microcavity 305 may be variously modified depending on sizes and resolutions of the display devices.

A first alignment layer 11 is formed on the pixel electrode 191. The first alignment layer 11 may be formed directly on the interlayer insulating layer 250 that is not covered by the pixel electrode 191.

A second alignment layer 21 is formed under the first insulating layer 350 that faces the first alignment layer 11.

The first alignment layer 11 and the second alignment layer 21 may be formed as vertical alignment layers, and may be made of an aligning material such as polyamic acid, polysiloxane, polyimide, etc. The first and second alignment layers 11 and 21 may be coupled to each other at an edge of the pixel as illustrated in FIG. 3.

The liquid crystal layer consisting of the liquid crystal molecules 310 is formed in the microcavity 305 that is positioned between the pixel electrode 191 and the lower insulating layer 350.

Further, a light blocking member 220 is formed in a region between the adjacent color filters 230, and particularly, the light blocking member 220 may be positioned, as illustrated in FIG. 2, on the pixel electrode 191 and the interlayer insulating layer 250 that is not covered by the pixel electrode 191. The light blocking member 220 is formed on a boundary of the pixel PX and the thin film transistor to prevent light leakage.

The light blocking member 220 is upwardly and downwardly expanded while extending along the gate line 121, and may include a horizontal light blocking member covering a region where the thin film transistor and the like are formed and a vertical light blocking member extending along the data line 171. In other words, the horizontal light blocking member may be formed in the first valley V1, and the vertical light blocking member may be formed in the second valley V2. The color filter 230 and the light blocking member 220 may overlap each other in some regions.

Next, the roof layer 360 is formed on the lower insulating layer 350. The roof layer 360 may be formed of an organic material. The microcavity 305 is formed under the roof layer 360, and the roof layer 360 maintains a shape of the microcavity 305 because it is hardened by a hardening process. The roof layer 360 is formed to be spaced apart from the pixel electrode 191 while interposing the microcavity 305 therebetween.

The roof layer 360 is formed in each pixel PX and the second valley V2 along the pixel row, but the roof layer 360 is not formed in the first valley V1. In the second valley V2, the microcavity 305 is not formed under the roof layer 360. Thus, a thickness of the roof layer 360 positioned in the second valley V2 may be formed to be larger than that of the roof layer 360 that is positioned in the pixel area, and the thicker region may be referred to as a support member 365. The microcavity 305 is formed such that its top and lateral surfaces are covered by the roof layer 360.

In other words, opposite sides of the microcavity 305 may be supported by the supporting member 365 formed on the same layer as the roof layer 360.

In the display device according to the first exemplary embodiment, an optical member 300 is formed on a portion corresponding to the supporting member 365 formed in the second valley V2 of the roof layer 360.

The optical member 300 is continuously formed on a top portion of the supporting member 365 along the supporting member 365 formed on the second valley V2 in a convex semicircular-pillar shape on the insulation substrate 110. An edge of the optical member 300 overlaps at least a portion of the adjacent microcavities 305.

The optical member 300 may be formed of the same material as the roof layer 360, and formed in an upward convex shape, thereby refracting a direction of light that is incident on the insulation substrate 110 from the outside.

In a typical display device using one insulation substrate 110, when liquid crystal molecules 310 are not vertically aligned, that is, when the liquid crystal molecules 310 are horizontally aligned, a process of rubbing the alignment layer 11 and 21 in one direction is difficult due to the microcavity 305 and the roof layer 360 covering the microcavity 305. Thus, to align the alignment layers 11 and 21 of a display device that uses one insulation substrate 110 and in which the liquid crystal molecules 310 are horizontally aligned, a photo-alignment method that aligns the alignment layers 11 and 21 using UV irradiation and the like is used.

When the microcavity 305 is formed according to a typical manufacturing process of a display device, a lateral wall of the microcavity 305 adjacent to the second valley V2 may be formed to be inclined. Due to the inclined lateral wall of the microcavity 305, while photo-aligning, a path of irradiated UV light is changed, thus total reflection of the UV light occurs. Accordingly, alignment may not be implemented at a portion of the alignment layers 11 and 21 corresponding to the inclined lateral wall of the microcavity 305.

Therefore, while photo-aligning, the irradiated light is vertically irradiated on the lateral wall of the microcavity 305 by using the optical member 300 according to the exemplary embodiment, thereby preventing bad alignment.

When a diameter of the optical member 300 is too small or too large, the irradiated light may not be properly incident on the lateral wall of the microcavity 305, and the path of the irradiated light may not be easily changed. Accordingly, the diameter of the optical member 300 may be formed to be wider than a width of the second valley V2, and to be narrower than a sum of widths of the second valley V2 and the microcavity 305.

The changing of the path of the light irradiated on the lateral wall of the microcavity 305 by the optical member 300 will be described later in detail.

The injection hole 307 is formed in the roof layer 360 to extend to and partially expose the microcavity 305. The first insulating layer 350 adjacent to a region where the injection hole 307 is formed may include a region that protrudes further than the roof layer 360.

Since the injection hole 307 may be formed at at least one or more edges of the pixel PX and the microcavity 305 is exposed by the injection hole 307, an aligning agent or a liquid crystal material may be injected into the microcavity 305 through the injection hole 307.

A second insulating layer 370 may be further formed on the roof layer 360. The second insulating layer 370 may be made of an inorganic insulating material such as a silicon nitride (SiNx), a silicon oxide (SiOx), etc. The second insulating layer 370 may be formed to cover the top and lateral surfaces of the roof layer 360. The second insulating layer 370 serves to protect the roof layer 360 that is formed of an organic material, and may be omitted if necessary.

The second insulating layer 370 may contact, as shown in FIG. 2, the first insulating layer 350 that protrudes further than the roof layer 360 in a region where the injection hole 307 is positioned. Further, the second insulating layer 370 may have a stepped cross-section due to a step between a region contacting the first insulating layer 350 and a region covering the roof layer 360.

Further, the second insulating layer 370 may be coupled to the lower insulating layer 350.

An overcoat 390 may be formed on the second insulating layer 370 and the injection hole 307.

The overcoat 390 is formed to cover the injection hole 307 through which the microcavity 305 is partially exposed outside. That is, the overcoat 390 may seal the microcavity 305 such that the liquid crystal molecules 310 inside the microcavity 305 are not discharged outside. The overcoat 390 may be made of a material that does not react with the liquid crystal molecules 310 because it contacts the liquid crystal molecules 310. For example, the overcoat 390 may be made of parylene and the like.

Further, the overcoat 390 serves to smooth the optical member 300 with the upward convex shape.

The overcoat 390 may be formed of a multilayer such as a double layer, a triple layer, etc. The double layer may be formed of two layers that are made of different materials. The triple layer consists of three layers, in which forming materials of adjacent layers are different from each other. For example, the overcoat 390 may include a layer formed of an organic insulating material and a layer formed of an inorganic insulating material.

Though not illustrated, polarizers may be formed on top and bottom surfaces of the display device. The polarizers may include a first polarizer and a second polarizer. The first polarizer may be attached to a bottom surface of the insulation substrate 110, and the second polarizer may be attached on top of the overcoat 390.

Next, the display device according to the first and second exemplary embodiments will be described with reference to FIGS. 4 and 5.

Figure 4:
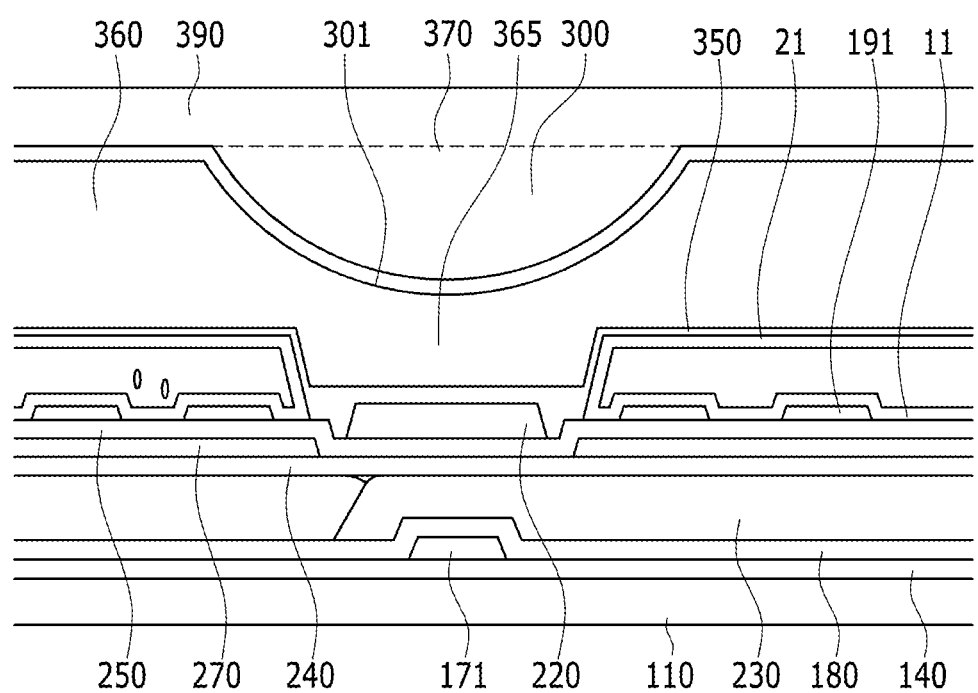
FIG. 4 is a cross-sectional view illustrating a display device according to a second exemplary embodiment.
Figure 5:
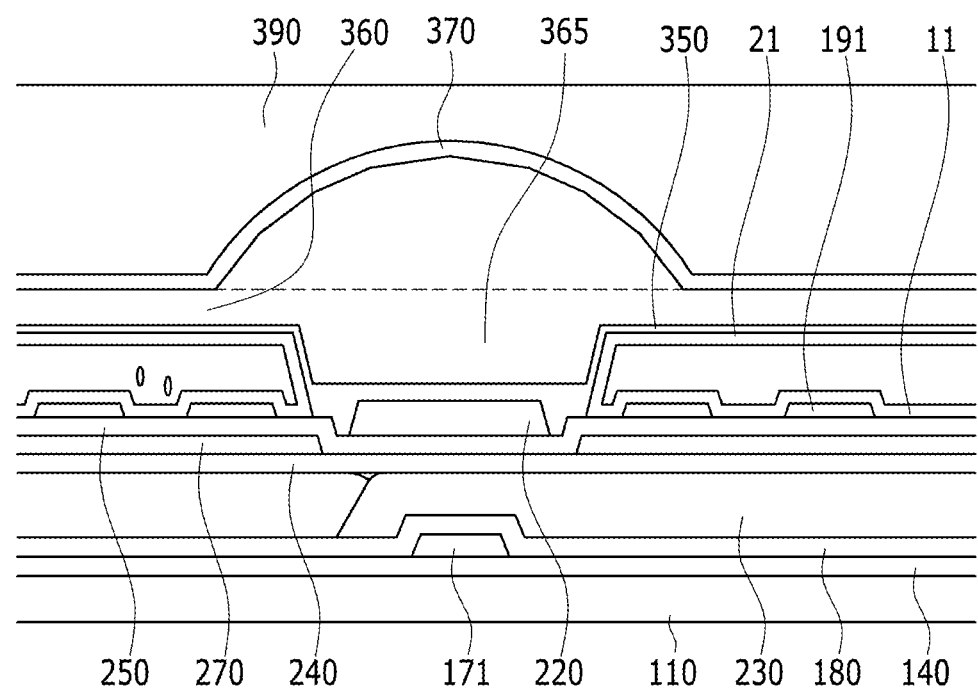
FIG. 5 is a cross-sectional view illustrating a display device according to a third exemplary embodiment.

FIG. 4 is a cross-sectional view illustrating a display device according to a second exemplary embodiment, and FIG. 5 is a cross-sectional view illustrating a display device according to a third exemplary embodiment.

First, compared with the display device of the first exemplary embodiment shown in FIG. 3, since the display devices of the second and third exemplary embodiments shown in FIGS. 4 and 5 are the same as that of the first exemplary embodiment except for the shape of the optical member 300, an overlapped description thereof will be omitted.

First, as shown in FIG. 4, an optical member 301 according to the second exemplary embodiment is continuously formed along a supporting member 365 formed in the second valley V2 in a concave semicircular shape for a direction of the insulation substrate 110. An edge of the optical member 301 overlaps at least a portion of the adjacent microcavities 305. The optical member 301 may be formed of the same material as the roof layer 360, and may be formed in the concave semicircular shape for the direction of the insulation substrate 110, thereby refracting a direction of light that is incident on the insulation substrate 110 from the outside.

In this case, a diameter of the optical member 301 may be formed to be wider than the width of the second valley V2, and to be narrower than the sum of widths of the second valley V2 and the microcavity 305.

Next, referring to FIG. 5, an optical member 302 according to the third exemplary embodiment may be continuously formed along the supporting member 365 formed in the second valley V2 in a upward convex shape for the insulation substrate 110, a cross-sectional surface of the optical member 302 may have a polygon shape with a many-sided surface; and a line completely linking outermost portions may have a semicircular shape.

An edge of the optical member 302 overlaps at least a portion of the adjacent microcavities 305.

The optical member 302 may be formed of the same material as the roof layer 360.

In this case, a diameter of the optical member 302 may be formed to be wider than a width of the supporting member 365 formed in the second valley V2, and to be narrower than the sum of widths of the supporting member 365 and the microcavity 305.

An operating principle with respect to the optical members 300 and 301 of the display devices according to the first and second exemplary embodiments will now be described with reference to FIGS. 6A to 7B.

Figure 6A:
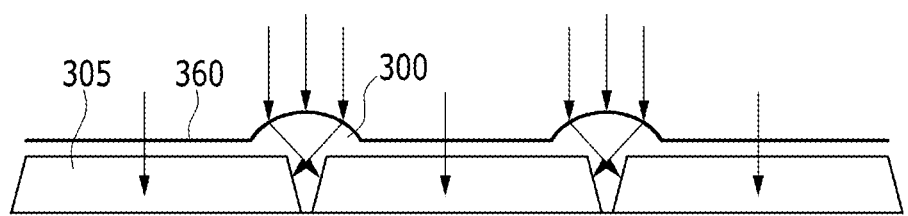
FIGS. 6A and 6B are schematic diagrams for explaining an operating principle with respect to an optical member of the display device according to the first exemplary embodiment.
Figure 6B:
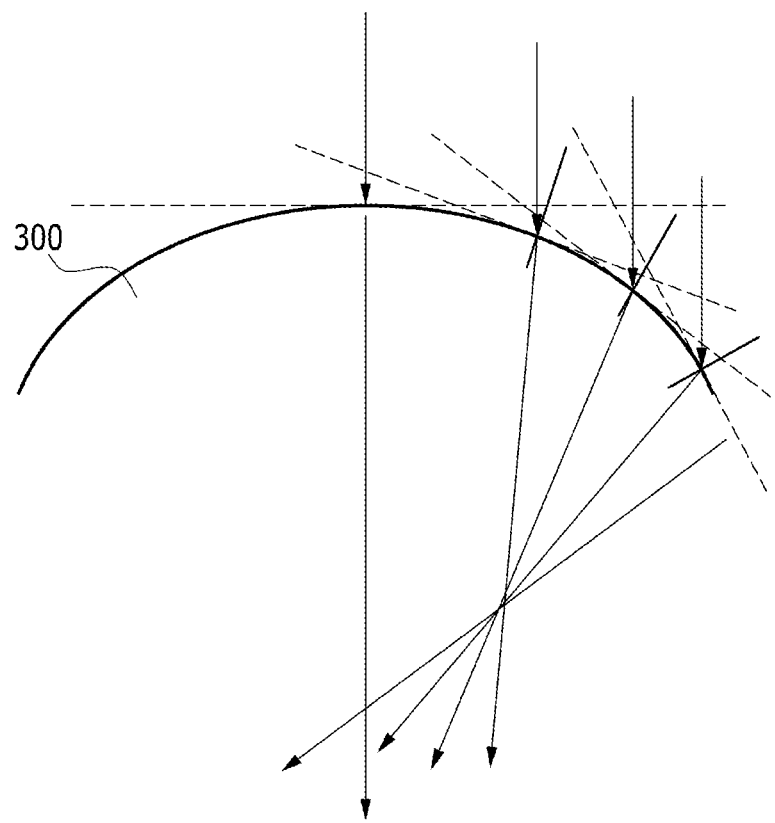
Figure 7A:
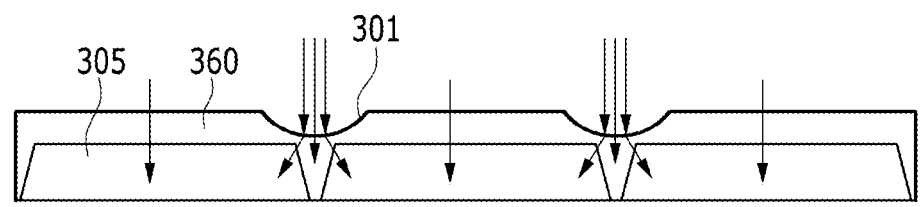
FIGS. 7A and 7B are schematic diagrams for explaining an operating principle with respect to an optical member of the display device according to the second exemplary embodiment.
Figure 7B:
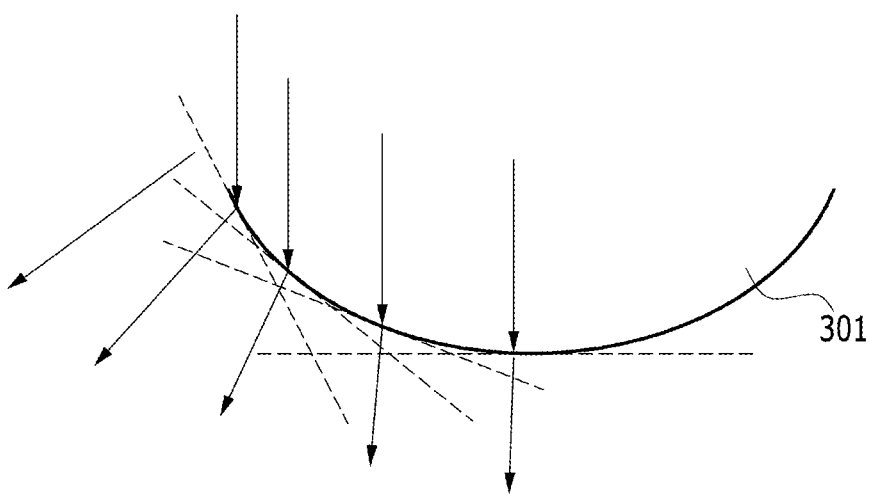

FIGS. 6A and 6B are schematic diagrams for explaining an operating principle with respect to the optical member of the display device according to the first exemplary embodiment, and FIGS. 7A and 7B are schematic diagrams for explaining an operating principle with respect to the optical member of the display device according to the second exemplary embodiment.

Referring to FIGS. 6A and 7A, the lateral wall of the microcavity 305 is formed to be inclined. The optical members 300 and 301 according to the first and second exemplary embodiments cover the lateral walls of the adjacent microcavities 305, and are formed in an upward convex shape or a downward concave shape.

Next, referring to FIGS. 6B and 7B, an incident angle of light may be changed on the convex-shaped or concave-shaped optical member 300 or 301 depending on a position at which the light is incident. In other words, as the first and second exemplary embodiments, respectively, include the optical members 300 and 301, the incident angle gradually increases from a central portion to an outside portion of the semicircular shape, thus refraction of the light occurs and light may be vertically incident on the inclined lateral wall of the microcavity 305.

Accordingly, while aligning the alignment layers 11 and 21, a non-aligned portion does not occur by the optical members 300 and 301, thereby improving alignment quality.

According to the exemplary embodiment, one substrate may be used to manufacture the display device, thereby reducing weight, thickness, cost, and processing time of the display device, and the optical member may be included in the display device, thereby preventing total reflection of light, bad alignment, and light leakage which may occur in the display device.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| 11: first alignment layer | 21: second alignment layer |
| 110: substrate | 121: gate line |
| 124: gate electrode | 140: gate insulating layer |
| 154: semiconductor | 171: data line |
| 180: passivation layer | 191: pixel electrode |
| 220: light blocking member | 230: color filter |
| 240: organic layer | 250: interlayer insulating layer |
| 270: common electrode | 305: microcavity |
| 307: injection hole | 310: liquid crystal molecule |
| 350: first insulating layer | 360: roof layer |
| 370: second insulating layer | 390: overcoat |
| 300, 301, 302: optical member | |

What is claimed is:

1. A display device comprising:
    a thin film transistor disposed on an insulation substrate including a plurality of pixels;
    a common electrode and a pixel electrode disposed on the thin film transistor to overlap each other while interposing an insulating layer therebetween;
    a microcavity including a plurality of microcavities, wherein each microcavity is separated from each other by an insulation layer,
    a liquid crystal layer filling microcavities differentiated by pixel electrodes, the pixel electrodes comprising the pixel electrode; and
    a roof layer that is disposed on a microcavity of the microcavities and includes an injection hole extending to the microcavity and a supporting member to support the microcavity;
    an optical member disposed on the supporting member, the optical member being a same material as the roof layer, wherein the optical member has a portion overlapping the supporting member, and the portion of the optical member has a gradually varying height throughout the portion's range,
wherein a diameter of the optical member is disposed to be wider than a width of a predetermined second valley, and to be narrower than a sum of widths of the second valley and the microcavity, wherein an edge of the optical member is disposed overlapping at least a portion of adjacent microcavities; and
a light blocking member in the second valley, wherein the optical member overlaps the light blocking member,
wherein the optical member transmits light.

2. The display device of claim 1, wherein the optical member has a semicircular-pillar shape.

3. The display device of claim 2, wherein the optical member is disposed to have a convex shape on the insulation substrate.

4. The display device of claim 3, wherein the optical member is disposed at the same layer as the roof layer.

5. The display device of claim 1, wherein liquid crystal molecules contained in the liquid crystal layer are disposed in a horizontal alignment mode.

6. The display device of claim 5, further comprising:
an alignment layer disposed on a surface of the microcavity,
wherein the alignment layer is a horizontal alignment layer.

7. The display device of claim 6, further comprising:
an overcoat disposed on the roof layer to cover the injection hole.

8. The display device of claim 7, further comprising:
the insulation layer disposed under the roof layer; and
a second insulating layer disposed over the roof layer.

9. The display device of claim 2, wherein the optical member is disposed to have a concave shape on the insulation substrate.

10. The display device of claim 9, wherein the optical member is disposed at the same layer as the roof layer.

11. The display device of claim 9, further comprising:
an alignment layer disposed on a surface of the microcavity,
wherein the alignment layer is a horizontal alignment layer.

12. The display device of claim 11, wherein an overcoat is disposed on the roof layer to cover the injection hole.

13. The display device of claim 1, wherein the optical member has a many-sided surface disposed with a polygon shape, and is disposed to have a convex shape on the insulation substrate.

14. The display device of claim 13, wherein the optical member is disposed at the same layer as the roof layer.

* * * * *